United States Patent
Mimura (10) Patent No.: US 9,876,257 B2
(45) Date of Patent: Jan. 23, 2018

(54) SECONDARY BATTERY AND ELECTRODE PRODUCTION METHOD

(71) Applicant: NEC ENERGY DEVICES, LTD., Sagamihara-shi, Kanagawa (JP)

(72) Inventor: Kazuya Mimura, Kanagawa (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 0 days.

(21) Appl. No.: 14/895,667

(22) PCT Filed: Dec. 10, 2013

(86) PCT No.: PCT/JP2013/083136
§ 371 (c)(1),
(2) Date: Dec. 3, 2015

(87) PCT Pub. No.: WO2014/203424
PCT Pub. Date: Dec. 24, 2014

(65) Prior Publication Data
US 2016/0141721 A1    May 19, 2016

(30) Foreign Application Priority Data
Jun. 21, 2013  (JP) .................................. 2013-131006

(51) Int. Cl.
H01M 6/12       (2006.01)
H01M 6/46       (2006.01)
(Continued)

(52) U.S. Cl.
CPC ......... H01M 10/0585 (2013.01); H01M 2/26 (2013.01); H01M 4/13 (2013.01);
(Continued)

(58) Field of Classification Search
CPC .......................... H01M 2/0207; H01M 2/021
See application file for complete search history.

(56) References Cited

U.S. PATENT DOCUMENTS

2002/0045094 A1*  4/2002  Yoshino ............... H01M 2/361
                                                          429/137

FOREIGN PATENT DOCUMENTS

CN          102629678 A     8/2012
JP          2004-303622 A   10/2004
(Continued)

OTHER PUBLICATIONS

International Search Report of PCT/JP2013/083136 dated Mar. 11, 2014.

(Continued)

Primary Examiner — Ula C Ruddock
Assistant Examiner — Julian Anthony
(74) Attorney, Agent, or Firm — Sughrue Mion, PLLC (57) ABSTRACT

Secondary battery includes a battery assembly configured by alternately stacking positive electrodes 1 and negative electrodes 6 via separators 20, in which the positive electrode and the negative electrode respectively include collectors 3 and 8, and active materials 2 and 7 applied on the collectors. On each surface of the collector, a coated portion coated with the active material and an uncoated portion not coated with any active material are provided. In one or both of the positive electrode and the negative electrode, boundary portion 4a between the coated portion and the uncoated portion on the front surface of the collector, is positioned planarly away from boundary portion 4b between the coated portion and the uncoated portion on the rear surface of the collector.

9 Claims, 6 Drawing Sheets (51) Int. Cl.
*H01M 2/02* (2006.01)
*H01M 2/08* (2006.01)
*H01M 10/0585* (2010.01)
*H01M 2/26* (2006.01)
*H01M 4/13* (2010.01)
*H01M 10/052* (2010.01)
*H01M 4/139* (2010.01)
*H01M 10/0566* (2010.01)

(52) U.S. Cl.
CPC ......... *H01M 4/139* (2013.01); *H01M 10/052* (2013.01); *H01M 10/0566* (2013.01)

(56) References Cited

FOREIGN PATENT DOCUMENTS

| JP | 2005-166353 A | 6/2005 |
|---|---|---|
| JP | 2006-19199 A | 1/2006 |
| JP | 2006-134760 A | 5/2006 |
| JP | 2006-147392 A | 6/2006 |
| JP | 2007-258050 A | 10/2007 |
| JP | 2008-300141 A | 12/2008 |
| JP | 2012-164470 A | 8/2012 |
| JP | 2012-204333 A | 10/2012 |
| JP | 2013-51035 A | 3/2013 |
| WO | 2005/081336 A1 | 9/2005 |
| WO | 2012/124188 A1 | 9/2012 |

OTHER PUBLICATIONS

Communication dated Jul. 10, 2017, issued by the Japanese Patent Office in counterpart Japanese application No. 2015-522469.
Communication dated Jan. 4, 2017, issued by the State Intellectual Property Office of People's Republic of China in counterpart of Chinese application No. 201380077634.0.

* cited by examiner

SECONDARY BATTERY AND ELECTRODE PRODUCTION METHOD

CROSS REFERENCE TO RELATED APPLICATIONS

This application is a National Stage of International Application No. PCT/JP2013/083136 filed Dec. 10, 2013 claiming priority based on Japanese Patent Application No. 2013-131006, filed Jun. 21, 2013, the contents of which are incorporated herein by reference in their entirety.

TECHNICAL FIELD

The present invention relates to a secondary battery configured by alternately stacking positive electrodes and negative electrodes via separators, and an electrode production method.

BACKGROUND ART

The secondary battery is widely used not only as a power source for a portable device such as a mobile phone, a digital camera, or a laptop computer but also as a power source for a vehicle or a household, and a lightweight lithium-ion secondary battery having a high energy density among others is now an energy storage device indispensable to our life style.

The secondary batteries can be largely classified as a wound type and a laminated type. The battery assembly of the wound type secondary battery has a structure in which a long positive electrode sheet and a long negative electrode sheet are wound a plurality of times with a separator interposed between positive electrode sheet and negative electrode sheet which are stacked. The battery assembly of the laminated type secondary battery has a structure in which positive electrode sheets and negative electrode sheets are alternately stacked together repeatedly with a separator interposed between each positive and negative electrode sheet. The positive electrode sheet and the negative electrode sheet include coated portions in which active material (including combined agent that include binder, conductive material or the like) are applied to collectors, and uncoated portions in which any active material are applied to collectors so that the uncoated portions can connect to an electrode terminal.

In both the wound type secondary battery and the laminated type secondary battery, the battery assembly is sealed in an exterior container so that one end of a positive electrode terminal can be electrically connected to the uncoated portion of the positive electrode sheet, the other end can be drawn out of the exterior container (exterior case), one end of a negative electrode terminal can be electrically connected to the uncoated portion of the negative electrode sheet, and the other end can be drawn out of the exterior container. An electrolytic solution is sealed together with the battery assembly in the exterior container. The trend is for an increase in secondary battery capacity year by year which may lead to higher heat generation that results in greater safety issues of short-circuiting. Thus, battery safety measures are becoming more important.

As an example of the safety measures, in order to prevent short-circuiting between the positive electrode and the negative electrode, there is known a technology for forming an insulating member in a boundary portion between the coated portion and the uncoated portion (Patent Document 1).

RELATED ART DOCUMENT LIST

Patent Document

Patent Document 1: JP2012-164470A

SUMMARY OF INVENTION

Problems to be Solved by the Invention

Figure 11:
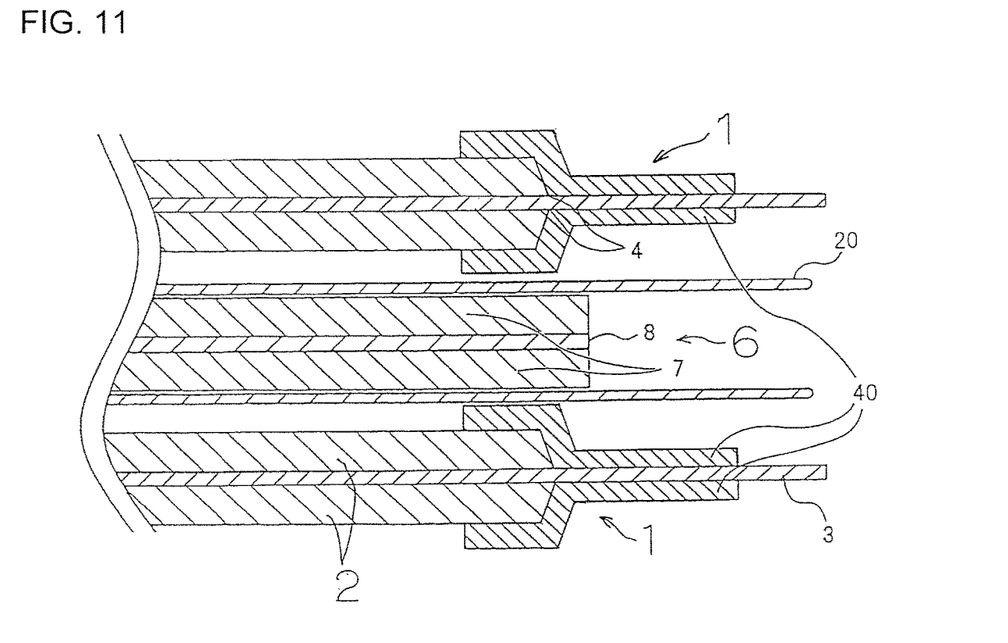
FIG. 11 An enlarged sectional view illustrating a laminated type secondary battery according to related art.

According to the technology disclosed in Patent Document 1, as illustrated in FIG. 11, positive electrodes 1 and negative electrodes 6 are alternately stacked via separators 20, and on collector 3 of positive electrode 1, insulating member 40 is formed to cover boundary portion 4 between a coated portion coated with active material 2 and an uncoated portion not coated with any active material 2. In the laminated type secondary battery, insulating members 40 are repeatedly stacked at the same position when seen planarly. Accordingly, at the position where insulating members 40 are disposed, the thickness of the battery assembly is partially increased to reduce energy density per volume.

Further, in order to stabilize electric characteristics or reliability, a tape or the like is used to adhere the battery assembly so that uniform pressure can be applied. However, when an insulating member similar to that described in Patent Document 1 is used for the laminated type secondary battery, the battery assembly cannot be uniformly pressed due to a difference in thickness between a part where insulating member 40 is present and a part where insulating member 40 is not present. As a result, the electric characteristics may vary or battery cycle characteristics may be reduced which lowers battery performance.

It is therefore an object of the present invention to provide a high-quality secondary battery having high reliability and high electric characteristics, and an electrode production method, which can solve the aforementioned problems, prevent short-circuiting between a positive electrode and a negative electrode by an insulating member, and suppress an increase in battery volume or deformation of the battery assembly.

Means to Solve the Problem

The present invention provides a secondary battery including a battery assembly configured by alternately stacking positive electrodes and negative electrodes via separators, in which the positive electrode and the negative electrode respectively include collectors and active materials applied on the collectors. On each surface of the collector, a coated portion coated with the active material and an uncoated portion not coated with any active material are provided. In one or both of the positive electrode and the negative electrode, a boundary portion between the coated portion and the uncoated portion on the front surface of the collector, is positioned planarly away from a boundary portion between the coated portion and the uncoated portion on the rear surface of the collector.

Effects of Invention

According to the present invention, since an increase in the volume of the battery assembly or deformation of the battery assembly caused by the insulating member can be suppressed, a high-quality secondary battery having a high energy density can be provided.

BRIEF DESCRIPTION OF DRAWINGS

FIG. 5b An enlarged plan view illustrating a positive electrode cut to be formed during the process illustrated in FIG. 5a.

FIG. 9b An enlarged sectional view cut along the line A-A illustrated in FIG. 9a.

DESCRIPTION OF EXEMPLARY EMBODIMENTS

Hereinafter, the exemplary embodiments of the present invention will be described with reference to the drawings.

Figure 1:
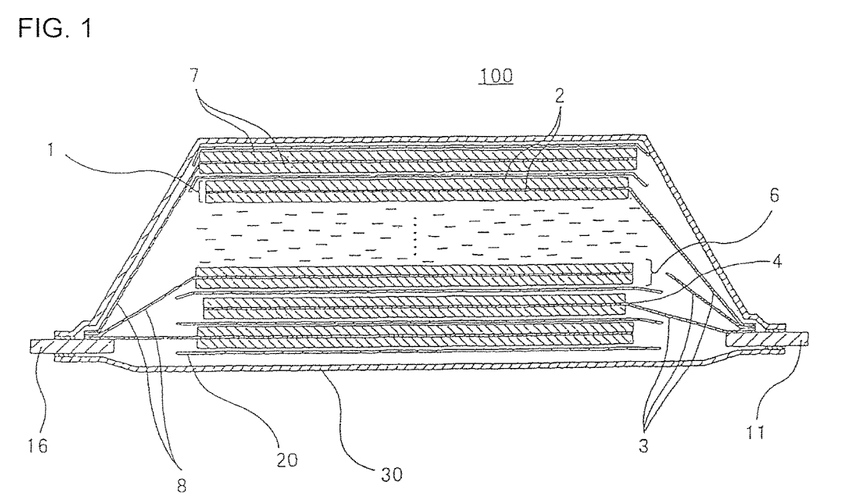
FIG. 1 A schematic sectional view illustrating the basic structure of a laminated type secondary battery according to the present invention.

FIG. 1 schematically illustrates an example of the configuration of a laminated type lithium-ion secondary battery according to the present invention. Lithium-ion secondary battery 100 according to the present invention includes an electrode laminated body (battery assembly) configured by alternatively stacking plural layers of positive electrodes (positive electrode sheets) 1 and negative electrodes (negative electrode sheets) 6 via separators 20. This electrode laminated body is received together with an electrolytic solution in an exterior container including flexible film 30. One end of positive electrode terminal 11 is connected to positive electrode 1 of the electrode laminated body, and one end of negative electrode terminal 16 is connected to negative electrode 6, and the other end side of positive electrode terminal 11 and the other end side of negative electrode terminal 16 are drawn out of flexible film 30. In FIG. 1, some (layers located in the middle part in a thickness direction) of the layers constituting the electrode laminated body are omitted, and the electrolytic solution is illustrated.

Positive electrode 1 includes positive electrode collector 3 and positive electrode active material 2 applied on positive electrode collector 3. Coated portions coated with positive electrode active materials 2 and uncoated portions not coated with positive electrode active material 2 are arranged side by side in a longitudinal direction, on the front surface and the rear surface of positive electrode collector 3. Similarly, negative electrode 6 includes negative electrode collector 8 and negative electrode active material 7 applied on negative electrode collector 8. Coated portions and uncoated portions are arranged side by side in the longitudinal direction, on the front surface and the rear surface of negative electrode collector 8.

The uncoated portion of each of positive electrode 1 and negative electrode 6 is used as a tab for connection to an electrode terminal (positive electrode terminal 11 or negative electrode terminal 16). Positive electrode tabs of positive electrodes 1 are collected on positive electrode terminal 11, and connected to each other together with positive electrode terminal 11 by ultrasonic welding or the like. Negative electrode tabs of negative electrodes 6 are collected on negative electrode terminal 16, and connected to each other together with negative electrode terminal 16 by ultrasonic welding or the like. Then, the other end of positive electrode terminal 11 and the other end of negative electrode terminal 16 are drawn out of the exterior container.

Figure 2:
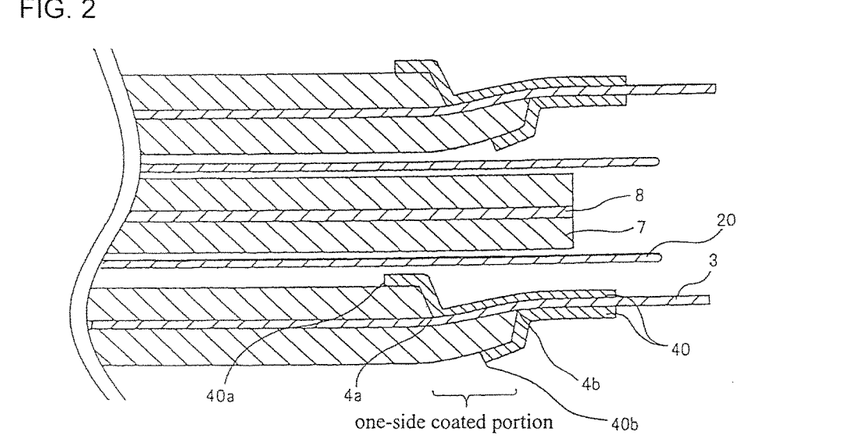
FIG. 2 An enlarged sectional view illustrating the main portion of the secondary battery according to an exemplary embodiment of the present invention.

As illustrated in FIG. 2, insulating member 40 for preventing short-circuiting of negative electrode terminal 16 is formed to cover boundary portion 4 between the coated portion and the uncoated portion of positive electrode 1. In order to cover boundary portion 4, insulating member 40 is preferably formed over both the positive electrode tab (part of positive electrode collector 3 not coated with positive electrode active material 2) and positive electrode active material 2. The formation of insulating member 40 will be described below.

The outer dimensions of the coated portion (negative electrode active material 7) of negative electrode 6 are larger than those of the coated portion (positive electrode active material 2) of positive electrode 1 and smaller or equal to those of separator 20.

In the battery illustrated in FIG. 1, for positive electrode active material 2, for example, a layered oxide material such as $LiCoO_2$, $LiNiO_2$, $LiNi_{(1-x)}CoO_2$, $LiNi_x(CoAl)_{(1-x)}O_2$, $Li_2MO_3$—$LiMO_2$, or $LiNi_{1/3}Co_{1/3}Mn_{1/3}O_2$, a spinel material such as $LiMn_2O_4$, $LiMn_{1.5}Ni_{0.5}O_4$, or $LiMn_{(2-x)}M_xO_4$, an olivine material such as $LiMPO_4$, an olivine fluoride material such as $Li_2MPO_4F$ or $Li_2MSiO_4F$, or a vanadium oxide material such as $V_2O_5$ can be used, and one of these materials or composite including two or more of these materials can be used.

For the negative electrode active material, a carbon material such as graphite, amorphous carbon, diamond carbon, fullerene, carbon nanotube, or carbon nanohorn, a lithium metal material, an alloy material such as silicon or tin, or an oxide material such as $Nb_2O_5$ or $TiO_2$, or a compound of these materials can be used.

Binders, conductive auxiliary agents, or the like can be added to positive electrode active material 2 and negative electrode active material 7 when appropriate. For the conductive auxiliary agent, one material in a group including carbon black, a carbon fiber, and graphite, or combination of two or more materials in the group can be used. For the binder, polyvinylidene fluoride, polytetrafluoroethylene, carboxymethylcellulose, modified acrylonitrile rubber particles, or the like can be used.

For positive electrode collector 3, aluminum, stainless steel, nickel, titanium, or an alloy of these can be used, and the aluminum is particularly preferable. For negative electrode collector 8, copper, stainless steel, nickel, titanium, or an alloy of these can be used.

For the electrolytic solution, one of organic solvents including annular carbonate such as ethylene carbonate, propylene carbonate, vinylene carbonate, butylene carbonate, or the like, chain carbonate such as ethylmethyl carbonate (EMC), diethyl carbonate (DEC), dimethyl carbonate (DMC), dipropyl carbonate (DPC), or the like, fatty carboxylic acid ester, γ-lactone such as γ-butyrolactone, chain ester, and annular ester, or composite including two or more of the organic solvents can be used. Further, lithium salt can be dissolved in these organic solvents.

Separator 20 mainly includes a resin porous membrane, resin woven cloth, resin unwoven cloth, or the like, and, for the resin component of them, for example, a polyolefin rein such as polypropylene or polyethylene, a polyester resin, an acrylic resin, a styrene resin, or a nylon resin can be used. The polyolefin microporous membrane is particularly preferable because of its high ion permeability and because the membrane properties enable physically isolating the positive electrode and the negative electrode from each other. In addition, when necessary, a layer including inorganic particles may be formed in separator 20. For the inorganic particles, an insulating oxide, an insulating nitride, an insulating sulfide, or an insulating carbide can be used, and particularly $TiO_2$ or $Al_2O_3$ is preferably included.

For the exterior container, a case including flexible film 30, a can case, or the like can be used, and flexible film 30 is preferably used from the standpoint of achieving a light weight battery. For flexible film 30, a film having resin layers formed in the front surface and the rear surface of a metal layer serving as a base can be used. For the metal layer, a layer having barrier characteristics to prevent the leakage of the electrolytic solution, the incursion of moisture, or the like can be selected, and therefore aluminum and stainless steel can be used. A thermal adhesive resin layer such as modified polyolefin is provided on at least one surface of the metal layer. The exterior container is formed by setting the thermal adhesive resin layers of flexible film 30 opposite each other and heat-sealing the surroundings of a part to receive an electrode laminated body. A resin layer such as a nylon film or a polyester film can be provided on the surface of the exterior body opposite the surface on which the thermal adhesive resin layer is formed.

A terminal made of aluminum or an aluminum alloy can be used for positive electrode terminal 11, and a terminal made of copper, a copper alloy, or such a material plated with nickel can be used for negative electrode terminal 16. The other ends of respective terminals 11 and 16 are drawn out of the exterior container. At the positions of respective terminals 11 and 16 that corresponds to the heat-sealed portion of the outer periphery of the exterior container, thermal adhesive resins can be provided in advance.

For insulating member 40 formed to cover boundary portion 4 between the coated portion and the uncoated portion of positive electrode active material 2, polyimide, a glass fiber, polyester, polypropylene, or a material including them can be used. Insulating member 40 can be formed by applying heat to a tape-shaped resin member to be fused to boundary portion 4 or applying and then drying a gel resin on boundary portion 4.

FIG. 2 is a schematic sectional view illustrating lithium-ion secondary battery 100 according to the exemplary embodiment of the present invention, schematically describing only a part of the electrode laminated body in an enlarged manner.

As illustrated in FIG. 2, in the exemplary embodiment, at least a part of the coated portion of active material 2 of positive electrode 1 is a one-side coated portion in which positive electrode active material 2 is applied to only one side (lower surface in FIG. 2). In other words, boundary portions 4a and 4b between the coated portions and the uncoated portions of positive electrode active material 2 are formed to be on different planar positions on the front surface and the rear surface of positive electrode collector 3. A double-side coated portion, a one-side coated portion, and a double-side uncoated portion are arranged in this order from the center (left side in FIG. 2) of the electrode laminated body toward the outer peripheral part.

Figure 3:
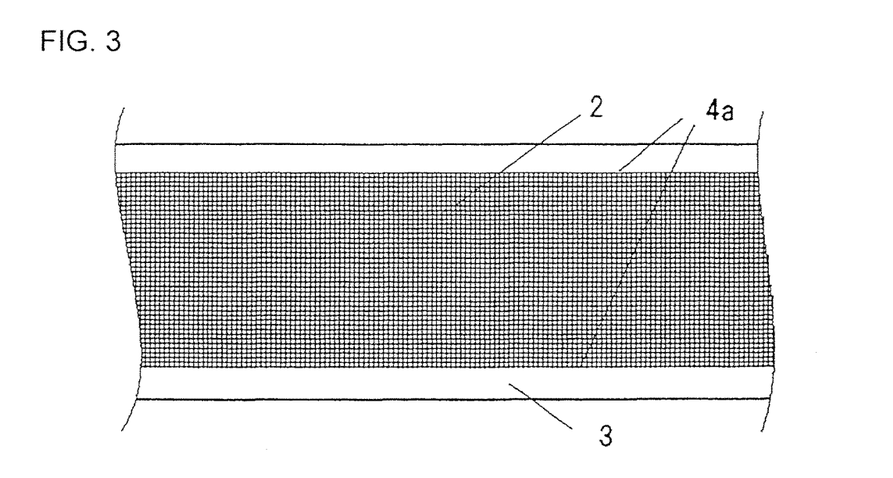
FIG. 3 An enlarged plan view illustrating a process of the production method of the secondary battery according to the present invention.
Figure 4:
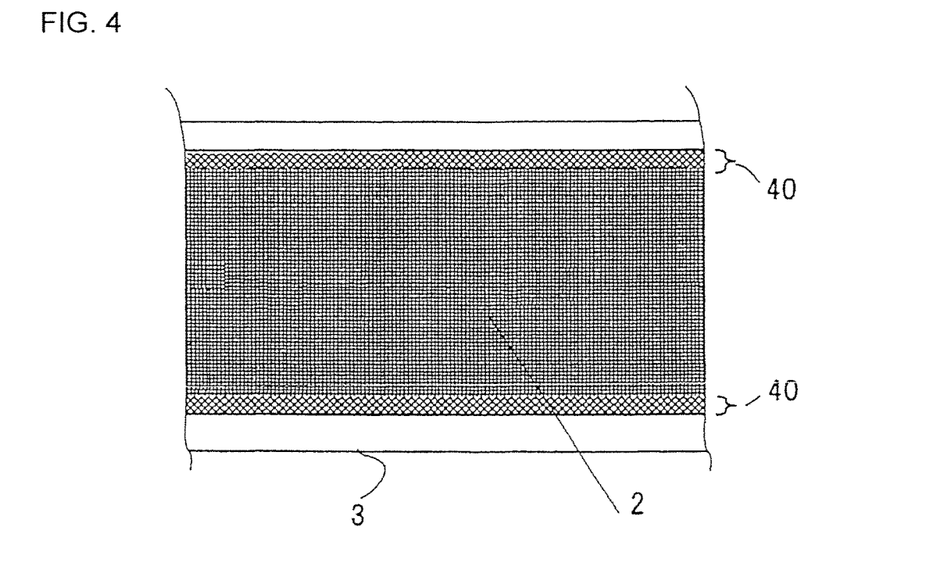
FIG. 4 An enlarged plan view illustrating a process subsequent to the process of the production method of the secondary battery according to the present invention illustrated in FIG. 3.

FIGS. 3 and 4 are schematic views illustrating states during electrode manufacturing, for easier description of a positional relationship between positive electrode 1 and insulating member 40 of the laminated type battery (laminated battery) illustrated in FIGS. 1 and 2.

FIG. 3 illustrates a state where positive electrode active material 2 is applied to the surface of large positive electrode collector 3 for manufacturing a plurality of positive electrodes (positive electrode sheets) 1. As illustrated in FIG. 4, on the surface of positive electrode collector 3, insulating member 40 is formed to cover boundary portion 4a between the coated portion and the uncoated portion. Similarly, positive electrode active material 2 is applied on the rear surface of positive electrode collector 3. Then, as illustrated in FIG. 2, on the rear surface of positive electrode active material 2, insulating member 40 is formed to cover boundary portion 4b between the coated portion and the uncoated portion. Thus, insulating members 40 are formed at the ends of the coated portions of positive electrode active materials 2 on both surfaces of positive electrode collector 3. In other words, insulating member 40 is formed to cover boundary portion 4 over the coated portion and the uncoated portion of positive electrode active material 2. As illustrated in FIG. 2, on one surface of positive electrode collector 3, when seen planarly, insulating member 40 is positioned in boundary portion 4a between the double-side coated portion and the one-side coated portion. Specifically, insulating member 40 is formed in a manner such that one end 40a of insulating member 40 is positioned on positive electrode active material 2 and the other end of insulation member 40 is positioned on the surface of positive electrode collector 3 to cover boundary portion 4a and positive electrode active material 2 and positive electrode collector 3 near boundary portion 4a. On the other surface of positive electrode collector 3, when viewed planarly, insulating member (another insulating member) 40 is positioned to cover boundary portion 4b between the one-side coated portion and the double-side coated portion. Specifically, insulating member 40 is formed in a manner such that one end 40b of insulating member 40 is positioned on positive electrode active material 2 and the other end of insulation member 40 is positioned on the rear surface of positive electrode collector 3 to cover boundary portion 4b and positive electrode active material 2 and positive electrode collector 3 near boundary portion 4b. As illustrated in FIG. 2, boundary portion 4a between the coated portion and the uncoated portion on the front surface of positive electrode collector 3 and boundary portion 4b between the coated portion and the uncoated portion on the rear surface of positive electrode collector 3 are at different positions when viewed planarly. In other words, boundary portions 4a and 4b between the coated portions and the uncoated portions are shifted from each other in position, between the front surface and the rear surface of positive electrode active material 2. Accordingly, ends 40a and 40b of insulating member 40 are located planarly away from each other in order to prevent insulating members 40 from being oppositely placed via positive electrode collector 3 at the position (double-side coated portion) positive where electrode active materials 2 are oppositely placed via positive electrode collector 3. As a result, in the laminated body including one positive electrode, the thickness can be reduced by an amount almost equal to the thickness of one insulating member.

Because of the possibility that sufficient insulation may not be secured when the thickness of insulating member 40 is small, the thickness is preferably equal to or more than 10 μm. When the thickness of insulating member 40 is too large, preventing an increase in the thickness of the electrode laminated body of the present invention cannot be achieved, and thus insulating member 40 may be preferably thinner than the thickness of the layer of positive electrode active material 2. Preferably, the thickness of insulating member 40 is equal to or less than 90% of the thickness of the layer of positive electrode active material 2, and more preferably equal to or less than 60% of the thickness of the layer of positive electrode active material 2.

As illustrated in FIG. 2, by gently curving positive electrode active material 2 of the one-side coated portion, the increase in the thickness because of insulating member 40 is not precipitous, but gradual. Accordingly, boundary portion 4b is preferably shifted in position to the one-side coated portion side in comparison with boundary portion 4a, more preferably shifted to the one-side coated portion side five times or more than the thickness of insulating member 40, and further preferably shifted ten times or more than the thickness of insulating member 40.

Figure 5A:
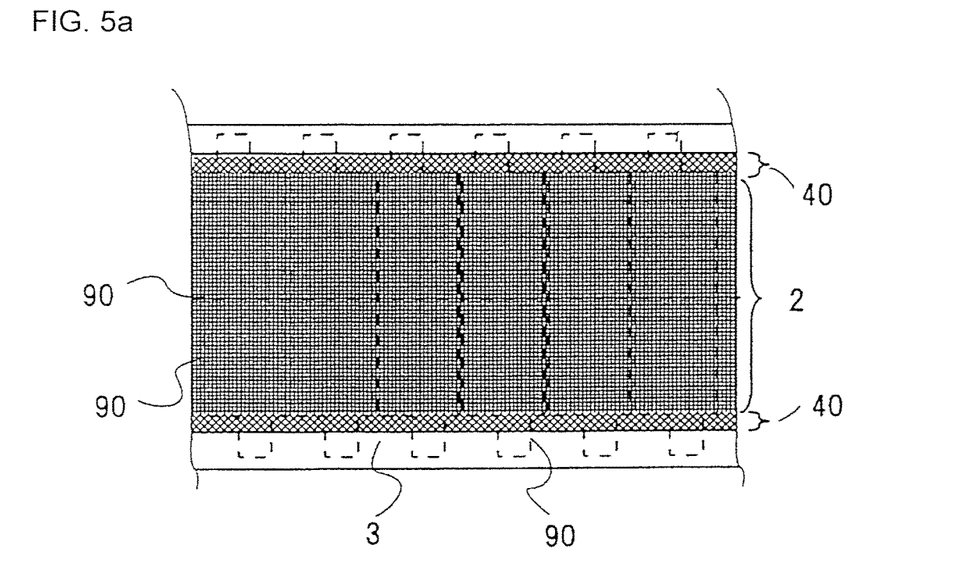
FIG. 5a An enlarged plan view illustrating a process subsequent to the process of the production method of the secondary battery according to the present invention illustrated in FIG. 4.
Figure 5B:
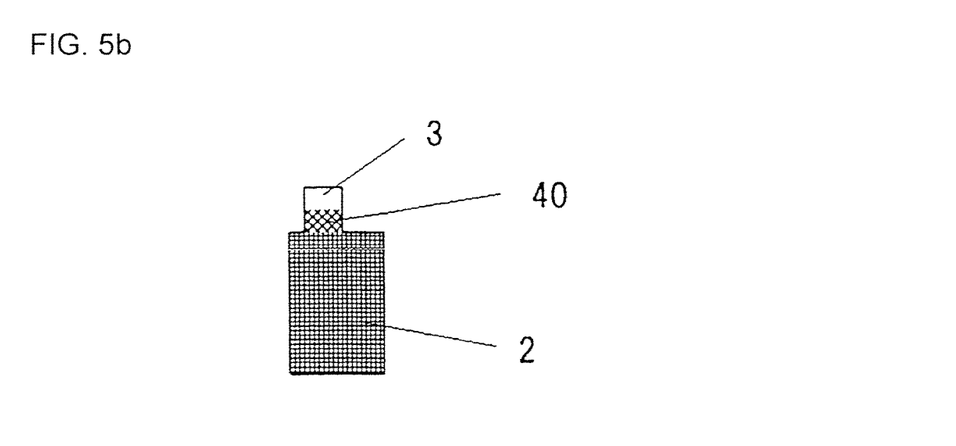

Then, in order to obtain positive electrode 1 used for each laminated type battery, positive electrode collector 3 is cut to be divided along cut line 90 indicated by a broken line illustrated in FIG. 5a, and positive electrode 1 having a desired size illustrated in FIG. 5b is obtained. Cut line 90 is a virtual line, and is thus not actually formed.

Though not illustrated, in order to manufacture a plurality of negative electrodes (negative electrode sheets) 6 as in the case of positive electrodes 1, negative electrode active material 7 is applied to both surfaces of large negative electrode collector 8. Then, to obtain negative electrode 6 used for each laminated type batteries, negative electrode collector 8 is cut to be divided, and negative electrode 6 having a desired size is obtained.

Positive electrode 1 illustrated in FIG. 5b and negative electrode 6 which are formed as mentioned above, are alternately stacked via separator 20, and positive electrode terminal 11 and negative electrode terminal 16 are connected to form the electrode laminated body illustrated in FIG. 2. This electrode laminated body is received together with the electrolytic solution in the exterior container including flexible film 30 to be sealed, and accordingly secondary battery 100 illustrated in FIG. 1 is formed.

In secondary battery 100, insulating member 40 that is formed on the one side [rear surface (lower surface in FIG. 2) in the exemplary embodiment] of positive electrode collector 3 is not positioned on the double-side coated portion but positioned only on the one-side coated portion and on the double-side uncoated portion. Accordingly, since all of two positive electrode active materials 2 and two insulating members 40 do not overlap in positive electrode 1, each positive electrode 1 can be thinned, and thus the entire electrode laminated body can be thinned. Since there is no partial increase in the thickness of the electrode laminated body, this electrode laminated body can be subjected to uniform pressure to be held, and quality reduction caused by variation in electric characteristics or reduction in cycle characteristics can be prevented.

The end of the coated portion (positive electrode active material 2) in boundary portion 4 with the uncoated portion may be slightly inclined as illustrated in FIG. 2, but may be erected substantially vertically to positive electrode collector 3. Similarly for negative electrode 6, the end of the coated portion (negative electrode active material 8) may be slightly inclined, or may be erected substantially vertically to negative electrode collector 7.

As illustrated in FIG. 2, in negative electrode 6 according to the exemplary embodiment, the planar positions of the boundary portions between the coated portions and the uncoated portions on the front surface and the rear surface of negative electrode collector 7 are not shifted from each other. Any insulating member 40 is not provided in negative electrode 6. Needless to say, however, when necessary, as in the case of positive electrode 1, the planar positions of the boundary portions on the front surface and the rear surface of negative electrode collector 7 may be shifted from each other, and insulating member 40 may be provided. As described above, the configuration where the positions of boundary portions 4 between the coated portions and the uncoated portions are planarly away from each other between the front surface and the rear surface of the collector and where the positions of insulating members 40 are planarly away from each other between the front surface and the rear surface of the collector, in other words, the configuration where the double-side coated portion, the one-side coated portion, and the double-side uncoated portion are arranged side by side in the longitudinal direction may be employed only for positive electrode 1, only for negative electrode 6, or for both positive electrode 1 and negative electrode 6.

Figure 6:
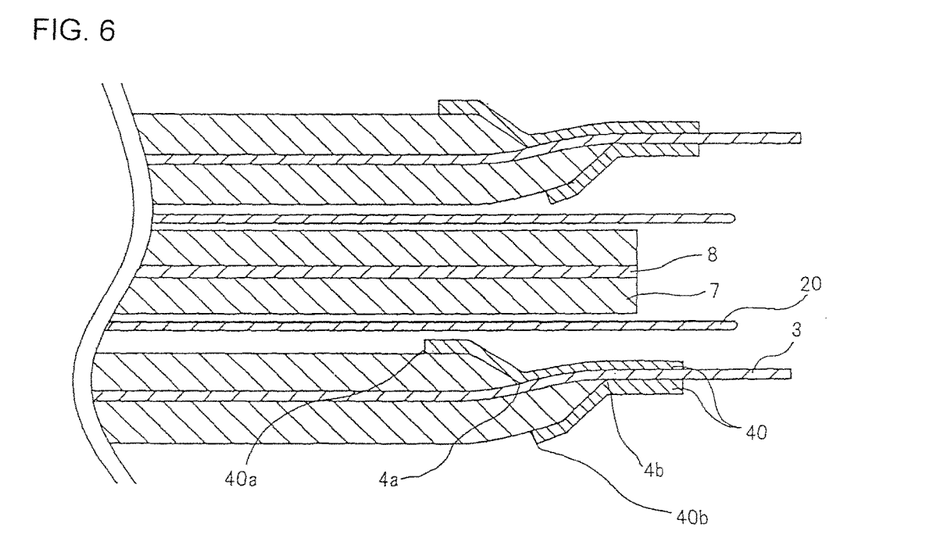
FIG. 6 An enlarged sectional view illustrating the main portion of a laminated type secondary battery according to the modified example of the present invention.
Figure 7:
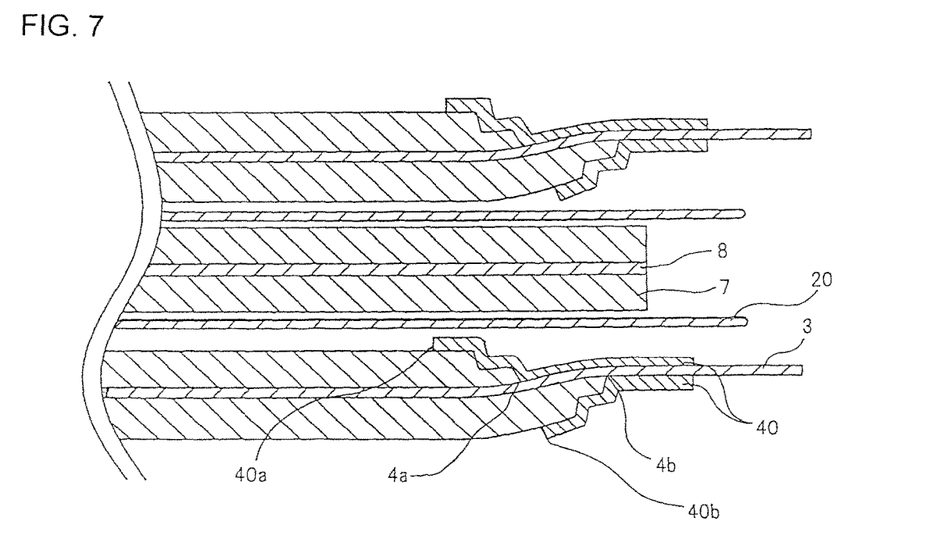
FIG. 7 An enlarged sectional view illustrating the main portion of a laminated type secondary battery according to another modified example of the present invention.

Modified examples of the exemplary embodiment are illustrated in FIGS. 6 and 7. In the modified example illustrated in FIG. 6, the end of the coated portion of positive electrode active material 2 is an inclined part in which the thickness is smoothly and continuously reduced. In the modified example illustrated in FIG. 7, the end of the coated portion of positive electrode active material 2 is a stepped part in which the thickness is reduced in a stepwise manner. The inclined part and the stepped part contribute to thinning of the positions of each positive electrode 1 in which insulating member 40 has been formed. The inclined part illustrated in FIG. 6 and the stepped part illustrated in FIG. 7 are lower in density than other parts.

The distance or the thickness of each member according to the present invention means, unless otherwise specified, an average value among measurement results in three or more points in the case of measurement carried out at any place.

EXAMPLE

Example 1

<Positive Electrode>

FIGS. 3 to 5b illustrate the production process of a lithium-ion secondary battery according to the present invention.

The mixed active material of $LiMn_2O_4$ and $LiNi_{0.8}Co_{0.1}Al_{0.1}O_2$ was used as a positive electrode active material, carbon black was used as a conductive agent, and PVdF was used as a binder, and a slurry having the combined agents thereof dispersed in an organic solvent was prepared. This slurry was continuously applied on one surface of positive electrode collector 3 mainly including aluminum with a thickness of 20 μm and then was dried to form positive electrode active material 2 with a thickness of 80 μm as illustrated in FIG. 3. At both ends of positive electrode collector 3 in a width direction, uncoated portions not coated with positive electrode active material 2 were provided. In other words, boundary portions 4a between the coated portion and the uncoated portion of positive electrode active material 2 were provided at both ends. Then, on the other surface of positive electrode collector 3, positive electrode active material 2 was formed with a thickness of 80 μm so that boundary portion 4b between the coated portion and the uncoated portion of positive electrode active material 2 was shifted inside by 2 mm from boundary portion 4a of the one surface.

A method for coating the collector with the active material will be described. As a device for applying the active material, a device for implementing various coating methods such as a doctor blade, a die coater, a gravure coater, a transfer method, and a deposition method can be used. According to the present invention, in order to control the position of the end of coated portion of the active material, the use of the die coater is particularly preferable. The coating methods of the active material by the die coater are largely classified into two types, namely, a continuous coating method for continuously forming the active material along the longitudinal direction of the long collector, and an intermittent coating method for alternately and repeatedly forming the coated portions and the uncoated portions of the active material along the longitudinal direction of the collector.

Figure 8:
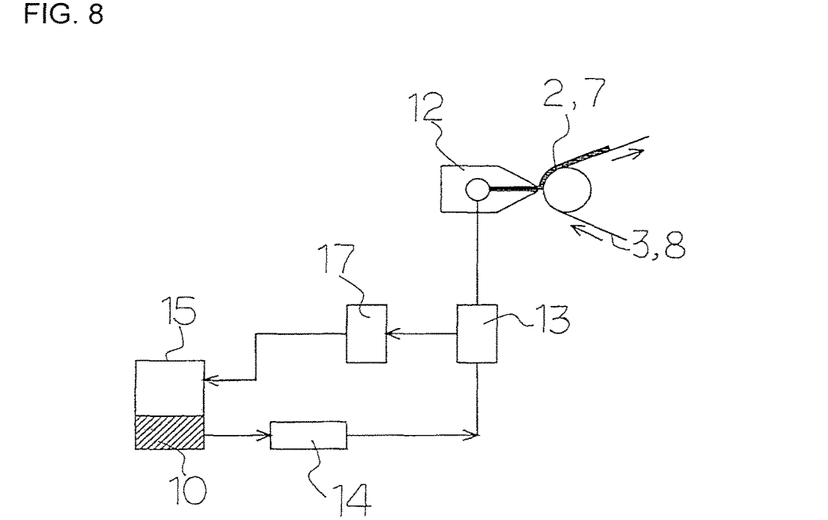
FIG. 8 A block diagram schematically illustrating the example of a device used for intermittent application of an active material.

FIG. 8 illustrates an example of the configuration of the die coater for carrying out intermittent coating. As illustrated in FIG. 8, on the slurry flow path of the die coater for carrying out intermittent coating, there are provided die head 12, coating valve 13 connected to die head 12, pump 14, and tank 15 for storing slurry 10. Return valve 17 is provided between tank 15 and coating valve 13. In this configuration, a motor valve is preferably used for at least coating valve 13. The motor valve can accurately change the open/close state of the valve even during slurry coating. Accordingly, by combining coating valve 13 including the motor valve with the operation of return valve 17 to control the slurry flow path or the like, a boundary portion between the coated portion and the uncoated portion of the active material can be formed into a desired shape.

Figure 9A:
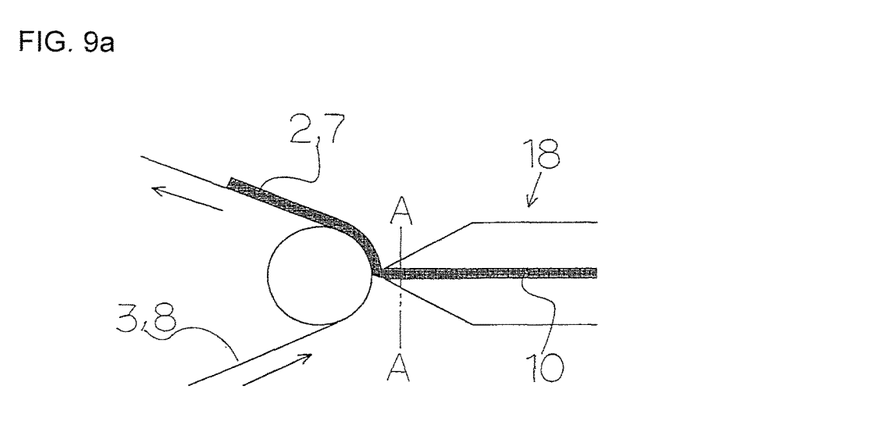
FIG. 9a A sectional view schematically illustrating the example of a device used for continuous application of the active material.
Figure 9B:
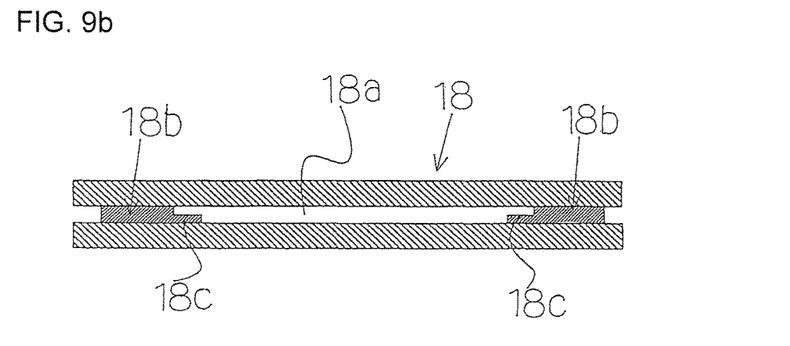

In addition, by using a die coater schematically illustrated in FIGS. 9a and 9b, active material can be formed by carrying out continuous coating. At both ends of outlet 18a of die head 18 of this die coater, shims 18b having tapered parts or stepped parts 18c whose thickness has been reduced toward the center of outlet 18a are provided. By using shim 18b, active material can be formed so as to form a stepped part or an inclined part at the end of the coated portion.

After the application of positive electrode material 2 on positive electrode collector 3 in the above-mentioned manner, as illustrated in FIG. 4, insulating tape (insulating member) 40 made of polypropylene and having a thickness of 30 μm was adhered to cover boundary portions 4a and 4b. In this case, insulating tape 40 provided to cover boundary portion 4b between the one-side coated portion of positive electrode active material 2 and a double-side uncoated portion not coated with positive electrode active material 2, was adhered to cover boundary portion 4b and a part of positive electrode collector 3 so that one end 40b was positioned within the range of the one-side coated portion shifted by 1 mm from the end (boundary portion 4a) of positive electrode active material 2 positioned on the surface of the opposite side via positive electrode collector 3. Then, a positive electrode roll illustrated in FIG. 10 was manufactured.

<Negative Electrode>

Graphite having an amorphous covered surface was used as negative electrode active material 7, PVdF was used as binder, and a slurry having the combined agents thereof dispersed in an organic solvent was prepared. This slurry was continuously applied on copper foil with a thickness of 15 μm that was negative electrode collector 8 and then was dried, and a negative electrode roll including the coated portion and the uncoated portion of negative electrode active material 7 was manufactured, as in the case of the positive electrode. The thickness of negative electrode active material 7 was 55 μm on one side. In this example, insulating material 40 was not provided on negative electrode 6.

<Manufacturing of Laminated Type Secondary Battery>

Obtained positive electrodes 1 and negative electrodes 6 were alternately stacked via separators 20 including polypropylene having a thickness of 25 μm, and negative electrode terminal 16 and positive electrode terminal 11 were attached thereto, and received in an exterior container including flexible film 30 to obtain a laminated type secondary battery having a thickness of 8 mm.

Example 2

By using a combined agent including $LiMn_2O_4$ as an active material, carbon black as a conductive agent, and PVdF as a binder, positive electrode active material 2 having a thickness of 35 μm was formed on the front and rear sides of positive electrode collector 3, respectively. Negative electrode active material 7 having a thickness of 35 μm made of non-graphitizable carbon was formed on the front and rear sides of negative electrode collector 8, respectively. Other conditions such as the forming positions of active materials 2 and 7 and insulating member 40 were similar to those of the Example 1, and a laminated type battery having a thickness of 3 mm was obtained.

Example 3

End 40b of insulating member 40 on positive electrode active material 2 of positive electrode collector 3 was shifted by 0.3 mm from end 4a of positive electrode active material 2 located on the surface of an opposite side via positive electrode collector 3, and other conditions were set similar to those of the Example 1 to obtain a laminated type battery. The thickness of the obtained laminated type battery was 8.1 mm.

Example 4

Boundary portion 4b between the coated portion and the uncoated portion of positive electrode active material 2 on the other surface of positive electrode collector 3 was shifted inside by 1 mm from boundary portion 4a of the one surface, and other conditions were set similar to those of the Example 3 to obtain a laminated type battery. The thickness of the obtained laminated type battery was 8.1 mm.

Example 5

During the formation of positive electrode 1 and negative electrode 6, positive electrode active material 2 and negative electrode active material 7 were intermittently applied to positive electrode collector 3 and negative electrode collector 8. Other conditions were set similar to those of the Example 1 to obtain a laminated type battery. The thickness of the obtained laminated type battery was 8 mm.

Comparative Example 1

Ends 4a and 4b of the coated portion of positive electrode active material 2 and ends 40a and 40b of insulating member 40 were arranged between the front surface and the rear surface of positive electrode collector 3 without being shifted from each other. Other conditions were similar to those of the Example 1 to obtain a laminated type battery. The thickness of this laminated type battery was 8.5 mm.

Comparative Example 2

Ends 4a and 4b of the coated portion of positive electrode active material 2 and ends 40a and 40b of insulating member 40 were arranged between the front surface and the rear surface of positive electrode collector 3 without being shifted from each other. Other conditions were similar to those of the Example 2 to obtain a laminated type battery. The thickness of this laminated type battery was 3.4 mm.

<Evaluation>

We obtained ten laminated type batteries for each example in the aforementioned manner, and then we evaluated their discharge capacities and the cycle characteristics. We confirmed that the laminated type batteries according to the Examples 1 to 5 exhibited very stable discharge capacities and cycle characteristics while the batteries according to the Comparative Examples 1 and 2 exhibited unstable discharge capacities and cycle characteristics compared with the batteries according to the Examples 1 to 5.

Figure 10:
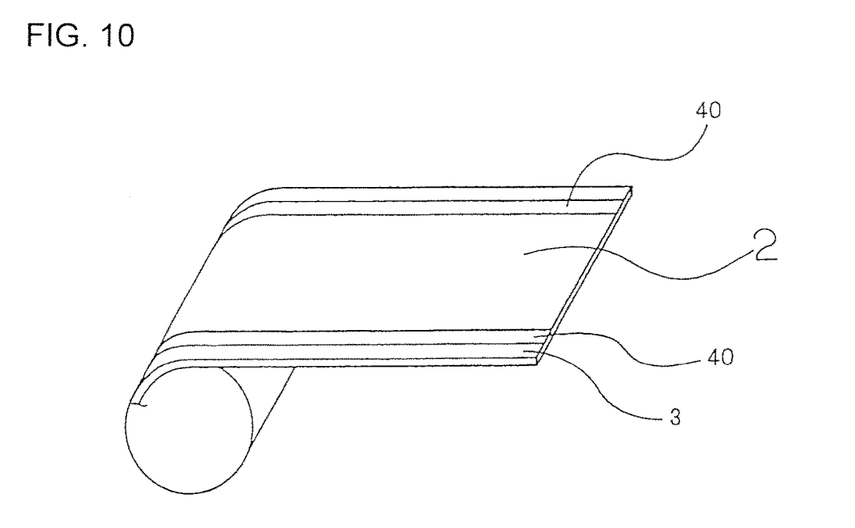
FIG. 10 A perspective view illustrating an electrode roll manufactured during the production method of the secondary battery according to the present invention.

In addition, when the active material was continuously applied during the manufacturing of positive electrode 1 and negative electrode 6, it was confirmed that we were able to prevent the distortion of an electrode roll similar to that illustrated in FIG. 10. In other words, as an electrode manufacturing method for manufacturing a laminated type battery, as described above, the method involves continuous coating in order to continuously apply the active material to the long collector and another method involves intermittent coating in order to intermittently apply the active material to the long collector. During continuous coating, according to the present invention, insulating member 40 is no longer present at the same position. As a result, distortion of a roll body of the electrode can be prevented to reduce the possibility of causing the damage to the active material or to the collector.

The present invention is useful for producing the electrode of the lithium-ion secondary battery and producing the lithium-ion secondary battery that uses the electrode. However, the present invention can be advantageously applied to a secondary battery other than a lithium-ion secondary battery.

This application claims priority from Japanese Patent Application No. 2013-131006 filed on Jun. 21, 2013, which is hereby incorporated by reference herein in its entirety.

REFERENCE NUMERALS

1 Positive Electrode
2 Positive electrode active material
3 Positive electrode collector
4, 4a, 4b Boundary portion
6 Negative electrode
7 Negative electrode active material
8 Negative electrode collector
11 Positive electrode terminal
16 Negative electrode terminal
20 Separator
40 Insulating member

The invention claimed is:

1. A secondary battery comprising:
    a battery assembly configured by alternately stacking positive electrodes and negative electrodes via separators, wherein:
    the positive electrode and the negative electrode respectively include collectors and active materials applied on the collectors;
    an exterior container for receiving the battery assembly;
    a coated portion in which the active material is coated and an uncoated portion in which the active material is not coated are provided on each surface of the collector; and
    in one or both of the positive electrode and the negative electrode, a boundary portion between the coated portion and the uncoated portion on a front surface of the collector is positioned planarly away from a boundary portion between the coated portion and the uncoated portion on a rear surface of the collector, and
    the secondary battery further comprises an insulating member which covers the boundary portion between the coated portion and the uncoated portion.

2. The secondary battery according to claim 1, wherein when seen planarly, a distance between an end of the coated portion side of the insulating member located on the front or rear surface of the collector, and the boundary portion between the coated portion and the uncoated portion on the other front or rear surface of the collector, is larger by five times or more than an average thickness of the insulating member.

3. The secondary battery according to claim 1, wherein a thickness of the insulating member is equal to or less than 60% of a thickness of the active material partially covered with the insulating member.

4. The secondary battery according to claim 1, wherein the thickness of the active material applied on the collector is not smaller than 25 µm and not larger than 100 µm, and the boundary portion between the coated portion and the uncoated portion on the front surface of the collector, and the boundary portion between the coated portion and the uncoated portion on the rear surface of the collector, are positioned planarly away from each other by 1.5 mm or more.

5. A secondary battery comprising:
    a battery assembly configured by alternately stacking positive electrodes and negative electrodes via separators,
    wherein the positive electrode and the negative electrode respectively include collectors and active materials applied on the collectors, and
    wherein a double-side coated portion in which the active material is applied on both sides of the collector, a one-side coated portion in which the active material applied on a front or rear surface of the collector and is not applied on the other front or rear surface, and a double-side uncoated portion in which the active material is not applied on both sides of the collector, are provided in one or both of the positive electrode and the negative electrode, and the secondary battery comprises an insulating member which is positioned in a boundary portion between the double-side coated portion and the one-side coated portion and which is formed over the active material and a part of the collector not coated with the active material; and another insulating member which is positioned in a boundary portion between the one-side coated portion and the double-side uncoated portion and which is formed over the active material and the part of the collector not coated with the active material.

6. The secondary battery according to claim 5, wherein a thickness of the active material applied on the collector is not smaller than 25 μm and not larger than 100 μm, and a length of the one-side coated portion in a longitudinal direction of the battery assembly is equal to or more than 1.5 mm.

7. The secondary battery according to claim 5, wherein when seen planarly, a distance between the boundary portion, which is between the part coated with the active material and the part not coated with the active material, on the front or rear surface of the collector and an end of the insulating member on the other front or rear surface of the collector, which is located in the one-side coated portion, is larger by five times or more than an average thickness of the insulating member.

8. The secondary battery according to claim 5, wherein a thickness of the insulating member is equal to or less than 60% of the thickness of the active material partially covered with the insulating member.

9. The secondary battery according to claim 1, further comprising:
    an electrolytic solution received together with the battery assembly in the exterior container;
    a positive electrode terminal having one end connected to the part of the collector of the positive electrode, which is not coated with the active material, and having the other end extending out of the exterior container; and
    a negative electrode terminal having one end connected to the part of the collector of the negative electrode, which is not coated with the active material, and having the other end extending out of the exterior container.

\* \* \* \* \*